US008085678B2

(12) United States Patent
Spindola et al.

(10) Patent No.: US 8,085,678 B2
(45) Date of Patent: Dec. 27, 2011

(54) MEDIA (VOICE) PLAYBACK (DE-JITTER) BUFFER ADJUSTMENTS BASED ON AIR INTERFACE

(75) Inventors: Serafin Diaz Spindola, San Diego, CA (US); Peter J. Black, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 862 days.

(21) Appl. No.: 10/964,319

(22) Filed: Oct. 13, 2004

(65) Prior Publication Data

US 2006/0077994 A1    Apr. 13, 2006

(51) Int. Cl.
*G06F 11/00* (2006.01)
(52) U.S. Cl. ........................... 370/252; 370/516
(58) Field of Classification Search .................. 370/235, 370/252, 412, 516, 519
See application file for complete search history.

(56) References Cited

U.S. PATENT DOCUMENTS

| | | | |
|---|---|---|---|
| 4,710,960 A | 12/1987 | Sato | |
| 5,283,811 A * | 2/1994 | Chennakeshu et al. | 375/233 |
| 5,317,604 A | 5/1994 | Osterweil | |
| 5,371,853 A | 12/1994 | Kao et al. | |
| 5,440,562 A | 8/1995 | Cutler | |
| 5,586,193 A | 12/1996 | Ichise et al. | |
| 5,640,388 A | 6/1997 | Woodhead et al. | |
| 5,696,557 A | 12/1997 | Yamashita et al. | |
| 5,794,186 A | 8/1998 | Bergstrom et al. | |
| 5,899,966 A | 5/1999 | Matsumoto et al. | |
| 5,929,921 A | 7/1999 | Taniguchi et al. | |
| 5,940,479 A | 8/1999 | Guy et al. | |
| 5,966,187 A | 10/1999 | Do | |
| 6,073,092 A | 6/2000 | Kwon | |
| 6,134,200 A | 10/2000 | Timmermans | |
| 6,240,386 B1 | 5/2001 | Thyssen | |
| 6,259,677 B1 | 7/2001 | Jain | |
| 6,366,880 B1 | 4/2002 | Ashley | |
| 6,370,125 B1 | 4/2002 | Belk | |
| 6,377,931 B1 | 4/2002 | Shlomot | |
| 6,456,964 B2 | 9/2002 | Manjunath et al. | |

(Continued)

FOREIGN PATENT DOCUMENTS

EP    0707398    4/1996

(Continued)

OTHER PUBLICATIONS

Benaissa et al. "An algorithm for delay adjustment for interactive audio applications in mobile ad hoc networks," Proceedings of the Seventh International Symposium on Computers and Communications, Jul. 2002, pp. 524-529.

(Continued)

*Primary Examiner* — Pao Sinkantarakorn
*Assistant Examiner* — Chandrahas Patel
(74) *Attorney, Agent, or Firm* — Heejong Yoo (57) ABSTRACT

Systems and methods for adapting a de-jitter buffer to conform to air link conditions. An air link characteristic may be detected before that characteristic begins to affect packet delivery, such as by slowing or speeding delivery delay at a subscriber station. A receiver-side de-jitter buffer, which adds delay to received packets, may adaptively adjust its size based upon the detected air link characteristic, such that the de-jitter buffer is appropriately sized for anticipated data packets before they are received at the subscriber station.

22 Claims, 5 Drawing Sheets

U.S. PATENT DOCUMENTS

| | | | |
|---|---|---|---|
| 6,496,794 B1 | 12/2002 | Kleider et al. | |
| 6,693,921 B1 | 2/2004 | Whitfield | |
| 6,785,230 B1 | 8/2004 | Ogata et al. | |
| 6,813,274 B1 | 11/2004 | Suzuki et al. | |
| 6,859,460 B1 | 2/2005 | Chen | |
| 6,922,669 B2 | 7/2005 | Schalk et al. | |
| 6,925,340 B1 | 8/2005 | Suito et al. | |
| 6,944,510 B1 | 9/2005 | Ballesty et al. | |
| 6,996,626 B1 | 2/2006 | Smith | |
| 7,006,511 B2* | 2/2006 | Lanzafame et al. | 370/412 |
| 7,016,970 B2 | 3/2006 | Harumoto et al. | |
| 7,079,486 B2 | 7/2006 | Colavito et al. | |
| 7,117,156 B1 | 10/2006 | Kapilow | |
| 7,126,957 B1* | 10/2006 | Isukapalli et al. | 370/412 |
| 7,158,572 B2 | 1/2007 | Dunne et al. | |
| 7,263,109 B2 | 8/2007 | Ternovsky | |
| 7,266,127 B2 | 9/2007 | Gupta et al. | |
| 7,272,400 B1* | 9/2007 | Othmer | 455/453 |
| 7,280,510 B2* | 10/2007 | Lohtia et al. | 370/335 |
| 7,336,678 B2 | 2/2008 | Vinnakota et al. | |
| 7,424,026 B2 | 9/2008 | Mallila | |
| 7,496,086 B2 | 2/2009 | Eckberg | |
| 7,525,918 B2 | 4/2009 | LeBlanc et al. | |
| 7,551,671 B2* | 6/2009 | Tyldesley et al. | 375/240 |
| 2002/0016711 A1 | 2/2002 | Manjunath et al. | |
| 2002/0133334 A1 | 9/2002 | Coorman et al. | |
| 2002/0133534 A1 | 9/2002 | Forslow | |
| 2002/0145999 A1 | 10/2002 | Dzik | |
| 2003/0152093 A1 | 8/2003 | Gupta et al. | |
| 2003/0152094 A1 | 8/2003 | Colavito et al. | |
| 2003/0152152 A1 | 8/2003 | Dunne et al. | |
| 2003/0185186 A1 | 10/2003 | Tsutsumi et al. | |
| 2003/0202528 A1 | 10/2003 | Eckberg | |
| 2004/0022262 A1 | 2/2004 | Vinnakota et al. | |
| 2004/0039464 A1 | 2/2004 | Virolainen et al. | |
| 2004/0057445 A1 | 3/2004 | LeBlanc | |
| 2004/0120309 A1 | 6/2004 | Kurittu et al. | |
| 2004/0141528 A1 | 7/2004 | LeBlanc et al. | |
| 2004/0156397 A1* | 8/2004 | Heikkinen et al. | 370/516 |
| 2004/0179474 A1 | 9/2004 | Usuda et al. | |
| 2004/0204935 A1 | 10/2004 | Anandakumar et al. | |
| 2005/0036459 A1* | 2/2005 | Kezys et al. | 370/328 |
| 2005/0089003 A1 | 4/2005 | Proctor et al. | |
| 2005/0180405 A1 | 8/2005 | Bastin | |
| 2005/0228648 A1 | 10/2005 | Heikkinen et al. | |
| 2005/0243846 A1 | 11/2005 | Mallila | |
| 2006/0077994 A1 | 4/2006 | Spindola et al. | |
| 2006/0171419 A1 | 8/2006 | Spindola et al. | |
| 2006/0184861 A1 | 8/2006 | Sun et al. | |
| 2006/0187970 A1 | 8/2006 | Lee et al. | |
| 2006/0277042 A1 | 12/2006 | Vos et al. | |
| 2007/0206645 A1 | 9/2007 | Sundqvist et al. | |

FOREIGN PATENT DOCUMENTS

| | | |
|---|---|---|
| EP | 0731448 A2 | 9/1996 |
| EP | 1088303 A1 | 4/2001 |
| EP | 1221694 | 7/2002 |
| EP | 1 278 353 | 1/2003 |
| EP | 1278353 | 1/2003 |
| EP | 1536582 | 6/2005 |
| JP | 56-43800 | 10/1981 |
| JP | 57158247 A | 9/1982 |
| JP | 61-156949 | 7/1986 |
| JP | 64029141 | 1/1989 |
| JP | 02081538 | 3/1990 |
| JP | 2502776 | 8/1990 |
| JP | 04-113744 | 4/1992 |
| JP | 04150241 | 5/1992 |
| JP | 8130544 A | 5/1996 |
| JP | 08256131 | 10/1996 |
| JP | 9127995 A | 5/1997 |
| JP | 09261613 | 10/1997 |
| JP | 10-190735 | 7/1998 |
| JP | 2001045067 | 2/2001 |
| JP | 2001134300 A | 5/2001 |
| JP | 2003532149 | 10/2003 |
| JP | 2004153618 A | 5/2004 |
| JP | 2004-266724 | 9/2004 |
| JP | 2004-282692 | 10/2004 |
| JP | 2005-057504 | 3/2005 |
| JP | 2005521907 T | 7/2005 |
| JP | 2006-050488 | 2/2006 |
| RU | 2073913 | 2/1997 |
| RU | 2118058 | 8/1998 |
| WO | 88007297 | 9/1988 |
| WO | 9222891 | 12/1992 |
| WO | 9522819 | 8/1995 |
| WO | 9710586 | 3/1997 |
| WO | 0024144 | 4/2000 |
| WO | 0033503 | 6/2000 |
| WO | 0042749 | 7/2000 |
| WO | WO0055829 | 9/2000 |
| WO | WO0063885 A1 | 10/2000 |
| WO | WO0176162 A1 | 10/2001 |
| WO | 0182289 | 11/2001 |
| WO | WO0182293 | 11/2001 |
| WO | WO03083834 A1 | 10/2003 |
| WO | WO03090209 A1 | 10/2003 |
| WO | 2006099534 | 9/2006 |

OTHER PUBLICATIONS

Choudhury et al. "Design and analysis of optima adaptive de-jitter buffers," Computer Communications, Elsevier Science Publishers, vol. 27, No. 6, Apr. 2004, pp. 529-537.

Goldenstein et al. "Time Warping of Audio Signals," Computer Graphics International Proceedings, Jun. 18, 1999, pp. 1-7.

Verhelst et al. "An overlap-add technique based on waveform similarity (WSOLA) for high quality time-scale modification of speech," Acoustics, Speech, and Signal Processing, 1993. ICASSP-93., 1993 IEEE International Conference, vol. 2, Apr. 27-30, 1993 pp. 554-557.

Liang et al. "Adaptive playout scheduling using time-scale modification in packet voice communications," Acoustics, Speech, and Signal Processing, 2001. Proceedings. (ICASSP '01). 2001 IEEE International Conference, vol. 3, May 7-11, 2001, pp. 1445-1448.

Choudhury, et al., "Design And Analysis of Optimal Adaptive De-Jitter Buffers", Computer Communications, Elsevier Science Publishers BV, vol. 27, No. 6, Apr. 2004 pp. 529-537.

International Search Report—PCT/US05/037075—International Search Authority, European Patent Office—Feb. 27, 2006.

Written Opinion—PCT/US05/037075—International Search Authority, European Patent Office—Feb. 27, 2006.

International Preliminary Report on Patentability—PCT/US05/037075—The International Bureau of WIPO, Geneva, Switzerland—Apr. 17, 2007.

E. Moulines et al.: "Time-Domain and Frequency-Domain Techniques for Prosodic Modification of Speech," 1995 Elsevier Science B.V., (Chapter 15), pp. 519-555, XP002366713.

"Enhanced Variable Rate Codec, Speech Service Option 3 for Wideband Spread Spectrum Digital Systems," 3GPP2 C.S0014-A (Apr. 2004).

Boku et al., "Structures and Network Performance of The Ultra-fast Optical Packet Switching Ring Network", Technical Report of IEICE, Japan, The Institute of Electronics, Information and Communication Engineers, Jul. 26, 2002, vol. 102, No. 257, CS2002-56.

Bellavista, Paolo; Corradi, Antonio; Giannelli, Carlo: "Adaptive Buffering-based on Handoff Prediction for Wireless Internet Continuous Services", [Online] Sep. 23, 2005, pp. 1-12, XP002609715, Retrieved from the Internet : URL: http://citeseerx.ist.psu.edu/viewdoc/summary?doi=10.1.1.62.6005>.

European Search Report—EP10182855, Search Authority—Berlin Patent Office, Nov. 19, 2010.

Vatn, Jon-Olov: "Thesis proposal: Supporting real-time services to mobile Internet hosts". [Online] Jun. 5, 2002, pp. 1-21, XP002609716, Retrieved from the Internet: URL:http://web.it.kth.se/{maguire/vatn/research/thesis-proposal-updated.pdf> [retrieved on Nov. 15, 2010].

Translation of Office Action in Japan application 2008-501078 corresponding to U.S. Appl. No. 11/192,231 citing WO03083834, JP2001134300, US20040204935, US20040156397 and EP1536582 dated Mar. 1, 2011.

Translation of Office Action in Japan application 2008-501073 corresponding to U.S. Appl. No. 11/123,467, citing Verhelst_et_al_An_overlap_pp. 554-557_year_1993, US20040156397, WO01082289, US20020016711, JP9127995 and JP2003532149 dated Mar. 8, 2011.

Translation of Office Action in Japan application 2009-245217 corresponding to U.S. Appl. No. 11/216,872, citing JP57158247, JP8130544, JP10190735, JP2502776, JP08256131, JP02081538, JP64029141, JP2001045067, JP04150241 and JP5643800 dated Mar. 1, 2011.

* cited by examiner

MEDIA (VOICE) PLAYBACK (DE-JITTER) BUFFER ADJUSTMENTS BASED ON AIR INTERFACE

BACKGROUND

1. Field

The present disclosed embodiments relate generally to communications and more specifically to adaptively managing packet jitter in a packet-switched wireless communications system.

2. Background

In packet switched networks, the sending computer breaks a message into a series of small packets, and labels each packet with an address telling the network where to send it. Each packet is then routed to its destination via the most expedient route available, which means that not all packets traveling between the same two communications systems will necessarily follow the same route, even when they are from a single message. When the receiving computer gets the packets, it reassembles them into the original message.

Because each packet is handled separately, it is subject to a particular amount of delay that will be different from the delay times experienced by other packets within the same message. This variation in delay, known as "jitter," creates additional complications for receiver-side applications that must account for packet delay time when reconstructing messages from the received packages. If the jitter is not corrected, the received message will suffer distortion when the packets are re-assembled.

Unfortunately, in VoIP systems that operate over the Internet, there is no information available that a de-jitter buffer can use to foresee changes in packet delay, and thus the de-jitter buffer is unable to adapt in anticipation of such changes. Typically, the de-jitter buffer must instead wait for the arrival of packets in order to detect changes in packet delay by analyzing packet arrival statistics. Thus, de-jitter buffers tend to be reactive, adjusting if at all only after packet delay changes have occurred. Many de-jitter buffers are incapable of changing at all, and are simply configured to have conservatively large sizes, which, as explained above, may add unnecessary delay to message playback and cause a user's experience to be sub-optimal. There is therefore a need in the art for adaptive delay management for efficiently removing jitter from packet transmissions in a communication system that has variant channels.

SUMMARY

In one aspect of the present invention, a method for adapting a de-jitter buffer includes detecting a characteristic of an air link, estimating a packet delay based on the characteristic, and adapting the de-jitter buffer based on the estimated packet delay.

In another aspect of the present invention, a method for adapting a de-jitter buffer prior to a handoff event includes scheduling the handoff event, estimating a packet delay based on the scheduled handoff event, and adapting the de-jitter buffer based on the estimated packet delay.

In another aspect of the present invention, a method for initializing a de-jitter buffer includes detecting a characteristic of an air link, estimating a packet delay based on the characteristic, and initializing the de-jitter buffer based on the estimated packet delay.

In yet another aspect of the present invention, a subscriber station includes an antenna configured to receive communications signals over a wireless air link, a processor configured to receive measurements of an air link characteristic, and calculate a de-jitter buffer size as a function of the received air link characteristic, and a de-jitter buffer configured to have an adaptable size that is capable of conforming to the calculated size.

In a further aspect of the present invention, a subscriber station includes a processor configured to receive information about a scheduled handoff, estimate packet delay as a function of the scheduled handoff, and calculate a de-jitter buffer size as a function of the estimated packet delay, and a de-jitter buffer configured to have an adaptable size that is capable of conforming to the calculated size.

In a still further aspect of the present invention, a computer readable media embodies a program of instructions executable by a computer to perform a method of adapting a de-jitter buffer. The method includes detecting a characteristic of an air link, estimating a packet delay based on the characteristic, and adapting the de-jitter buffer based on the estimated packet delay.

In another aspect of the present invention, a computer readable media embodies a program of instructions executable by a computer to perform a method of adapting a de-jitter buffer prior to a handoff event. The method includes scheduling the handoff event, estimating a packet delay based on the scheduled handoff event, and adapting the de-jitter buffer based on the estimated packet delay.

In yet another aspect of the present invention, a subscriber station includes means for receiving communications signals over a wireless air link, means for calculating a de-jitter buffer size as a function of the received air link characteristic, and means for adapting the size of a de-jitter buffer so that the de-jitter buffer conforms to the calculated size.

In an additional aspect of the present invention, a subscriber station includes means for receiving information about a scheduled handoff, means for estimating packet delay as a function of the scheduled handoff, means for calculating a de-jitter buffer size as a function of the estimated packet delay, and means for conforming a de-jitter buffer to the calculated size.

DETAILED DESCRIPTION

Circuit switching has been used by telephone networks for more than 100 years. When a call is made between two parties, the connection is maintained for the entire duration of the call. However, much of the data transmitted during that time are wasted. For example, while one person is talking the other party is listening, only half of the connection is in use. Also, a significant amount of time in many conversations comprises dead air, where neither party is talking. Therefore, circuit switching networks actually waste available bandwidth by sending unnecessary communications data on the continuously open connection.

Instead of passing data back and forth the whole time in a circuit switched network, many data networks (such as the Internet) typically use a method known as packet switching. Packet switching opens the connection between two communications systems just long enough to send a small chunk of data, called a "packet," from one system to another. These short connections are repeatedly opened to send data packets back and forth, but no connection is maintained during times when there are no data to be sent. In packet switched networks, the sending computer breaks a message into a series of small packets, and labels each packet with an address telling the network where to send it. Each packet is then routed to its destination via the most expedient route available, which means that not all packets traveling between the same two communications systems will necessarily follow the same route, even when they are from a single message. When the receiving computer gets the packets, it reassembles them into the original message.

Circuit-switched voice communications can be emulated on packet-switched networks. IP telephony, also known as Voice-over IP ("VoIP"), uses packet switching for voice communications and to provide several advantages over circuit switching. For example, the bandwidth conservation provided by packet switching allows several telephone calls to occupy the amount of network space ("bandwidth") occupied by only one telephone call in a circuit-switched network. However, VoIP is known to be a delay-sensitive application. Since a transmitted message cannot be heard by the recipient until at least a certain amount of the packets have been received and reassembled, delays in receiving packets may affect the overall transmission rate of messages and the ability of a receiving communications system to re-assemble the transmitted message in a timely manner.

Delays in packet transmission may be caused, for example, by processing time required to packetize communications data, hardware and software delays in processing packets, and complex operating systems that use time-consuming methods for dispatching packets. Also, the communications network itself can cause delays in packet delivery time. Inconveniences caused by such delays can be compounded by the fact that in packet-switching systems, each packet may experience a different amount of delay time. Because each packet is handled separately, it is subject to a particular amount of delay that will be different from the delay times experienced by other packets within the same message. This variation in delay, known as "jitter," creates additional complications for receiver-side applications that must account for packet delay time when reconstructing messages from the received packages. If the jitter is not corrected, the received message will suffer distortion when the packets are re-assembled.

One method of attempting to reduce the effect of jitter in packet transmissions involves using a de-jitter buffer. Typically, a de-jitter buffer removes delay variations by adding an additional delay at the receiver side. By implementing this delay time, the de-jitter buffer is able to queue the packets in a holding area as they arrive. Although the packets arriving at the de-jitter buffer may arrive at inconsistent times, they can be retrieved by the receiver-side processor with consistent timing. The processor simply retrieves the packets from the queue in the de-jitter buffer as it needs them. Thus, de-jitter buffers are able to smooth packet retrieval by adding a certain amount of additional delay to packet arrival times.

By way of example, for digital voice communications the continuous flow of information usually comprises a voice packet every 20 ms. If an invariant channel is able to deliver packets every 20 ms., a de-jitter buffer is not required, because the receiver is already accessing the packets at their consistent 20 ms. arrival rate. However, for a variant channel that delivers packets at an inconsistent rate due to processing delays and the like, a de-jitter buffer may be required to smooth the packet rate at the receiver side. Typically, the additional delay added by such a de-jitter buffer is set to be the length of the longest run having no packet arrival within the transmission. For example, if a transmission includes a run of 80 ms. between packet arrivals, and this is the longest packet-less run, the de-jitter buffer should be at least 80 ms. in size in order to accommodate that gap. However, such a large de-jitter buffer would not be necessary for a variant channel having a 40 ms. maximum packet-less run. In this case, the 80 ms. de-jitter buffer would simply be implementing an unnecessary 40 ms. delay in the communications flow. Instead, the de-jitter buffer would only need to be 40 ms. in size.

Wireless communications systems are diverse, often including invariant channels, variant channels, and highly variant channels. Thus, a large de-jitter buffer that performs well on a highly variable channel is overkill for an invariant channel that doesn't require a de-jitter buffer. However, if a de-jitter buffer is too small, it will not be able to filter out the jitter on the highly variant channel. Yet, a small de-jitter buffer may drop some packets upon arrival of a large burst of packets (to catch up with playback of the packets), and may become depleted of packets during a long run of the transmission during which no packets arrive.

Unfortunately, in VoIP systems that operate over the Internet, there is no information available that a de-jitter buffer can use to foresee changes in packet delay, and thus the de-jitter buffer is unable to adapt in anticipation of such changes. Typically, the de-jitter buffer must instead wait for the arrival of packets in order to detect changes in packet delay by analyzing packet arrival statistics. Thus, de-jitter buffers tend to be reactive, adjusting if at all only after packet delay changes have occurred. Many de-jitter buffers are incapable of changing at all, and are simply configured to have conservatively large sizes, which, as explained above, may add unnecessary delay to message playback and cause a user's experience to be sub-optimal. There is therefore a need in the art for adaptive delay management for efficiently removing jitter from packet transmissions in a communication system that has variant channels.

Figure 1:
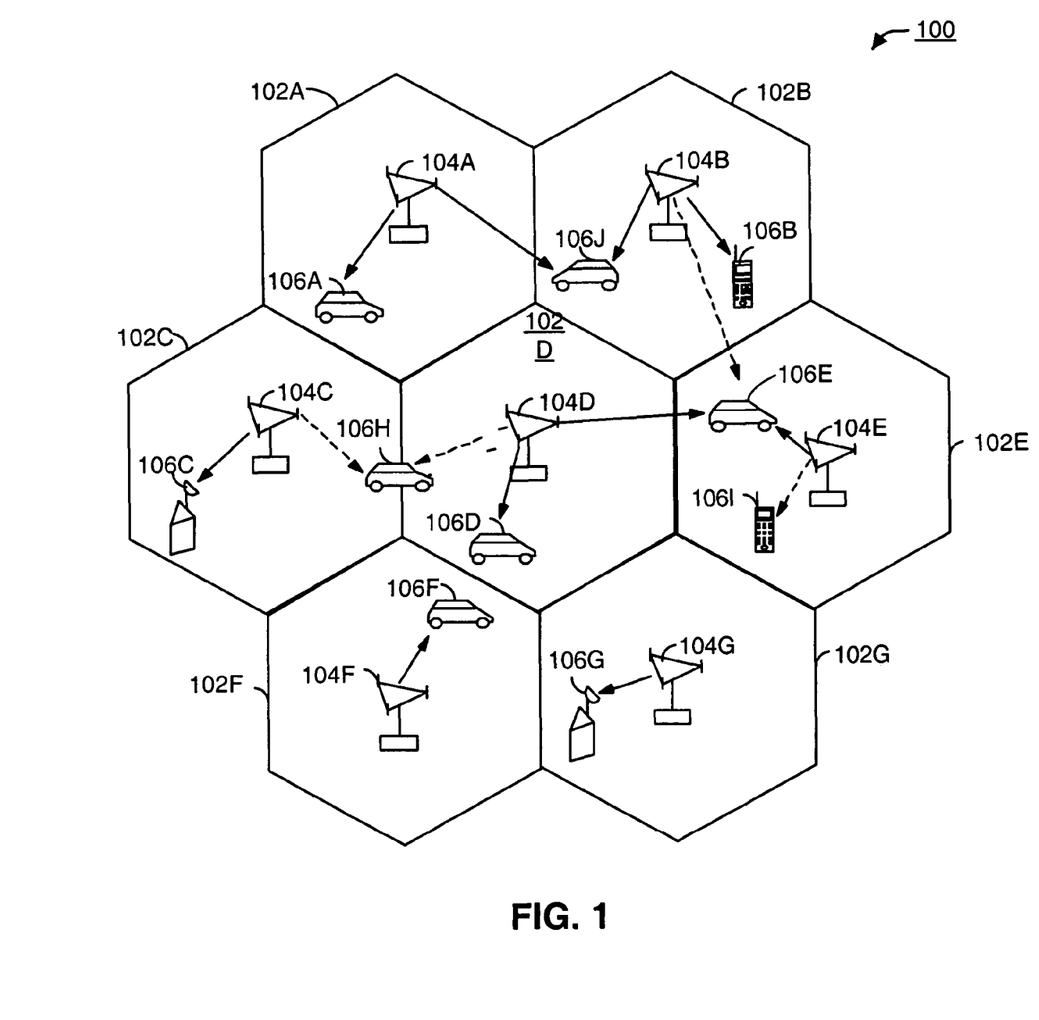
FIG. 1 illustrates a wireless communications system.

FIG. 1 illustrates a wireless communications system 100 that supports a plurality of users and is capable of implementing at least some aspects and embodiments of the present disclosures. The communications system 100 may provide communication capabilities for a plurality of cells 102A through 102G, each of which may be serviced by a corresponding base station 104A through 104G, respectively. In an illustrative embodiment, some of the base stations 104 may have multiple receive antennas and others may have only one receive antenna. Similarly, some of the base stations 104 may have multiple transmit antennas, while others have a single transmit antenna. There are no restrictions on the combinations of transmit antennas and receive antennas. Therefore, it is possible for a base station 104 to have multiple transmit antennas and a single receive antenna, or to have multiple receive antennas and a single transmit antenna, or to have both single or multiple transmit and receive antennas. A plurality of users may access communications system 100 using individual subscriber stations 106A through 106J. As used herein, the term "subscriber station" refers to car phones, cellular phones, satellite phones, personal digital assistants or any other remote station or wireless communications devices.

The illustrative wireless communications system 100 may utilize, for example, Code Division Time Multiplex ("CDMA") technology. A CDMA communications system is a modulation and multiple access scheme based on spread-spectrum communications. In a CDMA communications system, a large number of signals share the same frequency spectrum and, as a result, provide an increase in user capacity. This is achieved by transmitting each signal with a different pseudo-random binary sequence that modulates a carrier, thereby spreading the spectrum of the signal waveform. The transmitted signals are separated in the receiver by a correlator that uses a corresponding pseudo-random binary sequence to despread the desired signal's spectrum. The undesired signals, whose pseudo-random binary sequence does not match, are not despread in bandwidth and contribute only to noise.

More particularly, CDMA systems allow for voice and data communications between users over a terrestrial link. In a CDMA system, communications between users are conducted through one or more base stations. In wireless communications, "forward link" refers to the channel through which signals travel from a base station to a subscriber station, and "reverse link" refers to the channel through which signals travel from a subscriber station to a base station. By transmitting data on a reverse link to a base station, a first user on one subscriber station communicates with a second user on a second subscriber station. The base station receives the data from the first subscriber station and routes the data to a base station serving the second subscriber station. Depending on the location of the subscriber stations, both may be served by a single base station or multiple base stations. In any case, the base station serving the second subscriber station may send the data on the forward link. Instead of communicating with a second subscriber station, the first subscriber station may also communicate with a terrestrial Internet through a connection with a serving base station.

As will be recognized by those skilled in the art, CDMA systems may be designed to support one or more standards such as: (1) the "TIA/EIA/IS-95-B Mobile Station-Base Station Compatibility Standard for Dual-Mode Wideband Spread Spectrum Cellular System" referred to herein as the IS-95 standard; (2) the standard offered by a consortium named "3rd Generation Partnership Project" referred to herein as 3GPP; and embodied in a set of documents including Document Nos. 3G TS 25.211, 3G TS 25.212, 3G TS 25.213, and 3G TS 25.214, 3G TS 25.302, referred to herein as the W-CDMA standard; (3) the standard offered by a consortium named "3rd Generation Partnership Project 2" referred to herein as 3GPP2, and TR-45.5 referred to herein as the cdma2000 standard, formerly called IS-2000 MC; or (4) some other wireless standard.

Increasing demand for wireless data transmission and the expansion of services available via wireless communication technology have led to the development of specific data services. One such service is referred to as High Data Rate ("HDR"). One such HDR service, for example, is proposed in "EIA/TIA-IS856 cdma2000 High Rate Packet Data Air Interface Specification," referred to as the "HDR specification." HDR service is generally an overlay to a voice communications system that provides an efficient method of transmitting packets of data in a wireless communications system. As the amount of data transmitted and the number of transmissions increases, the limited bandwidth available for radio transmissions becomes a critical resource.

One example of a communications system that supports HDR services is referred to as 1× Evolution Data Optimized ("1×EV/DO"). 1×EV-DO has been standardized by the Telecommunication Industry Association as TIA/EIA/IS-856, "cdma2000, High Rate Packet Data Air Interface Specification." 1×EV-DO is optimized for high-performance and low-cost packet data services, bringing personal wireless broadband services to a wide range of customers. The teachings herein are applicable to 1×EV-DO systems, and to other types of HDR systems including but not limited to W-CDMA and 1×RTT. It is also to be understood that the teachings herein are not limited to CDMA systems, but are equally applicable to Orthogonal Frequency Division Multiplexing ("OFDM") and other wireless technologies and interfaces.

Figure 2:
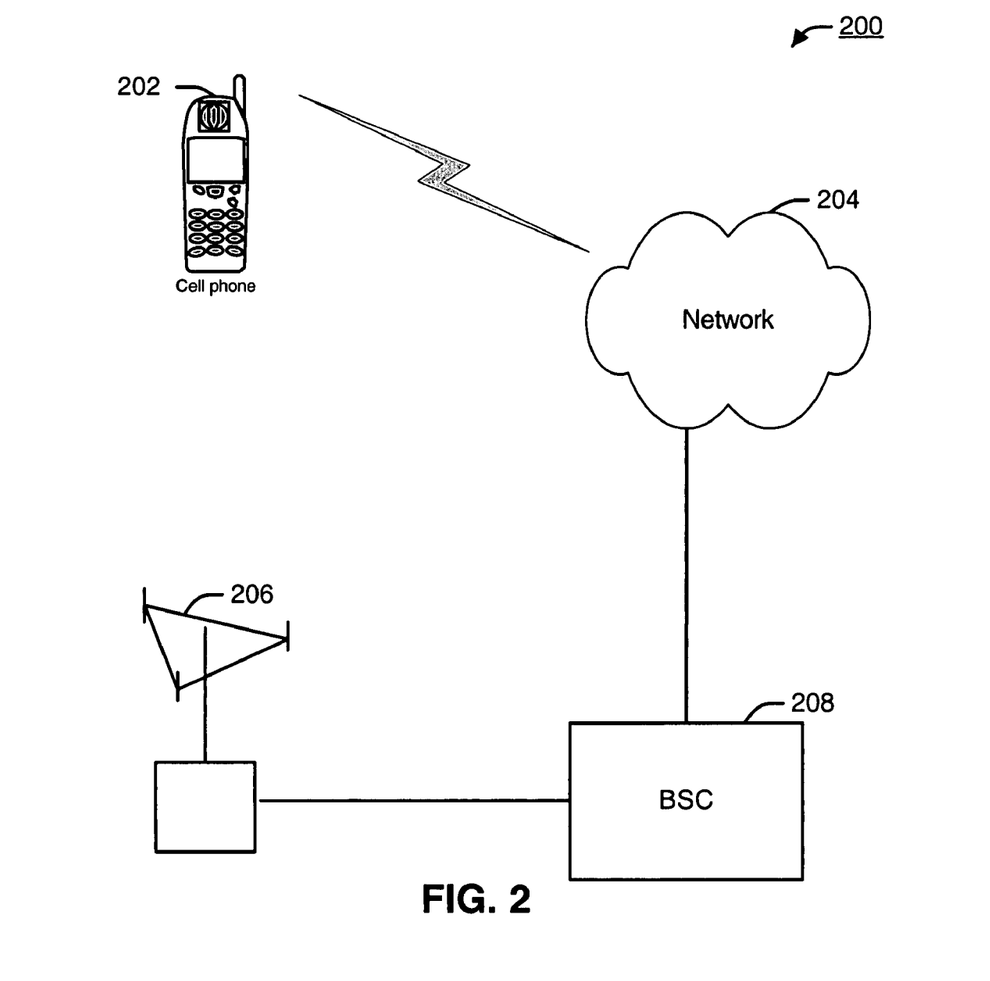
FIG. 2 is a wireless communication system supporting High Data Rate ("HDR") transmissions.

HDR communications system employing a variable rate data request scheme is shown in FIG. 2. HDR communications system 200 may comprise a CDMA communications system designed to transmit at higher data rates, such as a 1×EV-DO or other types of HDR communications systems. The HDR communications system 200 may include a subscriber station 202 in communication with a land-based data network 204 by transmitting data on a reverse link to a base station 206. The base station 206 receives the data and routes the data through a Base Station Controller ("BSC") 208 to the land-based network 204. Conversely, communications to the subscriber station 202 can be routed from the land-based network 204 to the base station 206 via the BSC 208 and transmitted from the base station 206 to the subscriber unit 202 on a forward link. As those skilled in the art will appreciate, the forward link transmission can occur between the base station 206 and one or more subscriber stations 202 (others not shown). Similarly, the reverse link transmission can occur between one subscriber station 202 and one or more base stations 206 (others not shown).

In the illustrative HDR communications system, the forward link data transmission from the base station 206 to the subscriber station 202 may occur at or near the maximum data rate that can be supported by the forward link. Initially, the subscriber station 202 may establish communication with the base station 206 using a predetermined access procedure. In this connected state, the subscriber station 202 can receive data and control messages from the base station 206, and is able to transmit data and control messages to the base station 206.

Once connected, the subscriber station 202 may estimate the Carrier-to-Interference ratio ("C/I") of the forward link transmission from the base station 206. The C/I of the forward link transmission can be obtained by measuring the pilot signal from the base station 206. Based on the C/I estimation, the subscriber station 202 may transmit a Data Request Message ("DRC message") to the base station 206 on the Data Request Channel ("DRC channel"). The DRC message may include the requested data rate or, alternatively, an indication of the quality of the forward link channel, e.g., the C/I measurement itself, the bit-error-rate, or the packet-error-rate, from which an appropriate data rate can be discerned. Alternatively, the subscriber station 202 may continuously monitor the quality of the channel to calculate a data rate at which the subscriber station 202 is able to receive a next data packet transmission. In either case, the base station 206 may use the DRC message from the subscriber station to efficiently transmit the forward link data at the highest possible rate.

Figure 3:
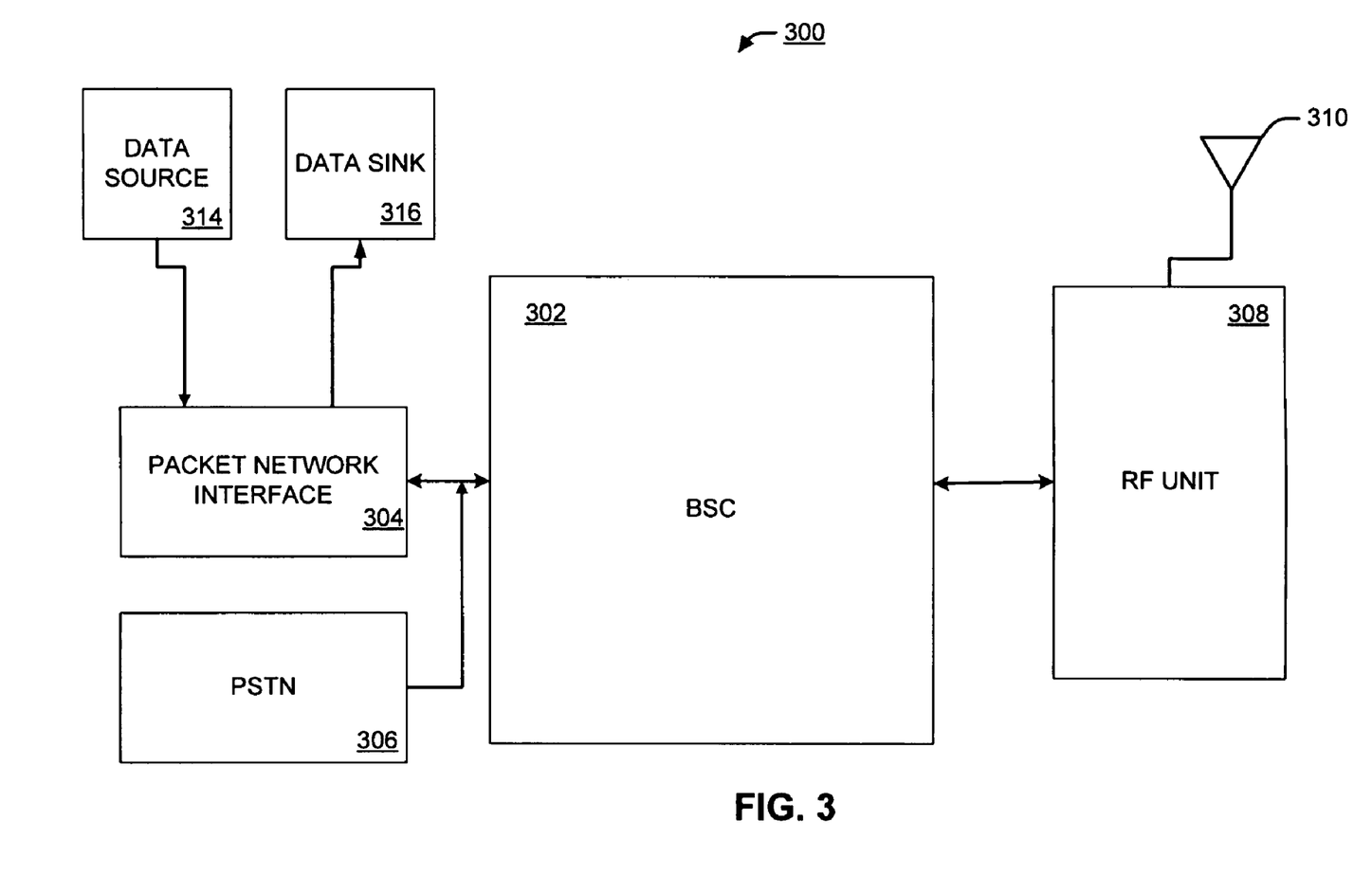
FIG. 3 is a block diagram illustrating the basic subsystems of an exemplary wireless communications system.

FIG. 3 is a block diagram illustrating the basic subsystems of the exemplary HDR communications system 300. A BSC 302 may interface with a packet network interface 304, a PSTN 306, and all base stations in the exemplary HDR communications system (only one RF Unit 308 is shown for simplicity). The RF Unit 308 may transmit communications data, under control of the BSC 302, to a subscriber station via an antenna 310. The BSC 302 may coordinate the communication between numerous subscriber stations in the exemplary HDR communications system and other users connected to the packet network interface 304 and the PSTN 306. The PSTN 306 may interface with users through the standard telephone network (not shown).

A data source 314 may contain the data which are to be transmitted to a target subscriber station. The data source 314 may provide the data to the packet network interface 304. The packet network interface 304 may receive the data and route them to the BSC 302, which may then send the data to a RF Unit 308 that is in communication with the target subscriber station. The RF Unit 308 may then insert control fields into each of the data packets, resulting in formatted packets. The RF Unit 308 may encode the formatted data packets and interleave (or re-order) the symbols within the encoded packets. Next, each interleaved packet may be scrambled with a scrambling sequence and covered with Walsh covers. The scrambled data packet may then be punctured to accommodate a pilot signal and power control bits, and spread with a long PN code and short PNI and PNQ codes. The spread data packet may be quadrature modulated, filtered, and amplified. Those skilled in the art will recognize that alternative methods of signal processing may be performed as well, and that the teachings herein are not limited to the specific processing steps disclosed above. After processing, the forward link signal may be transmitted over the air through an antenna 310 on the forward link to the target subscriber station. A data sink 316 is provided to receive and store data received.

The hardware described above supports variable rate transmissions of data, messaging, voice, video and other communications over the forward link. The data rate on both the forward and reverse links may vary to accommodate changes in signal strength and the noise environment at the subscriber station. Such changes may result in variations in the packet delay, i.e., jitter. For example, the RF Unit 308 may control the transmission rate of a subscriber station through a Reverse Activity ("RA") bit. A RA bit is a signal sent from a base station to a subscriber station that indicates how loaded the reverse link is (i.e. how much data is being sent on the reverse link). If a subscriber station has more than one base station in its active set, the subscriber station may receive a RA bit from each base station. As used herein the term "active set" refers to the base stations that a subscriber station is in communication with. The received RA bit may indicate whether the total reverse traffic channel interference is above a certain value. This, in turn, would indicate whether the subscriber station could increase or decrease its data rate on the reverse link. Similarly, a Traffic Channel Valid ("TCV") bit is a signal that is sent from the base station to a subscriber station to indicate how many users are in a sector. Although the TCV bit does not precisely indicate how loaded the forward link is, it may be somewhat related to sector loading. Thus, the TCV bit may indicate whether the subscriber station can increase or decrease its data rate requests for transmissions on the forward link. In either case, changes in the data rate may cause variations in packet delay, or jitter.

The data transmission rate may also be adjusted according to other indicia of signal quality. Signal quality on a communication may be determined, as described above, by measuring the C/I of a channel. Those skilled in the art will recognize that other methods for determining channel quality may be used as well. For example, the Signal-to-Interference-and-Noise Ratio ("SINR") or Bit Error Rate ("BER") are measurable characteristics that are indicative of signal quality. When changes in signal quality are detected, transmissions may be increased or decreased, accordingly. Again, such changes may result in packet jitter.

In addition to affecting data transmission rates, signal quality measurements may induce events known as "handoffs." For example, as a subscriber station moves from a first location to a second location, the quality of the channel may degrade. However, the subscriber station may be able to establish a higher quality connection with a base station closer to the second location. Thus, a soft handoff procedure may be initiated to transfer communications from one base station to another. A soft handoff is a process of choosing another sector from which data will be sent to the subscriber station. After the new sector is selected, an air traffic link is established with a new base station (in the selected sector) before breaking the existing air traffic link with the original base station. Not only does this approach reduce the probability of dropped calls, but it also makes the handoff virtually undetectable to the user.

A soft handoff may be initiated by detecting an increase in the pilot signal strength from a second base station as the subscriber station approaches the second location, and reporting this information back to the BSC through the first base station. The second base station may then be added to the subscriber station's active set, and an air traffic link established. The BSC may then remove the first base station from the active set and tear down the air traffic link between the subscriber station and the first base station.

Thus, various indicia of signal quality may be used to adjust the packet transmission rate over both the forward and reverse links in a wireless communications system. However, as described above, such changes may also affect packet delay at the subscriber station. Thus, a de-jitter buffer may be configured to have an adaptable size, such that it can accommodate such changes before they occur.

Figure 4:
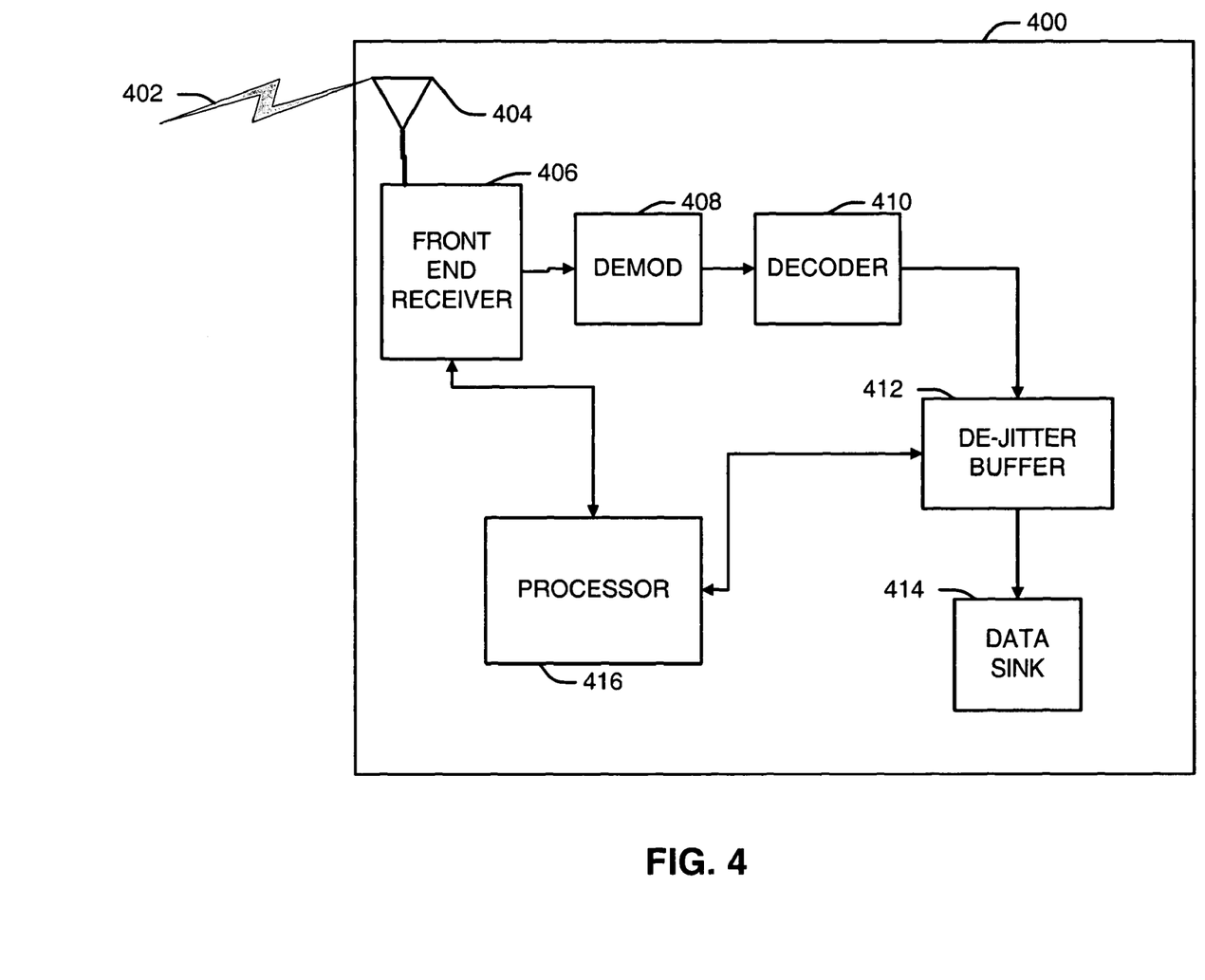
FIG. 4 is a block diagram illustrating the basic subsystems of an exemplary subscriber station.

FIG. 4 illustrates a subscriber station 400 configured to receive communications data that are formatted and transmitted as described above in connection with FIG. 3. At the target subscriber station 400, the forward link signal 402 may be received by an antenna 404 and routed to a front end receiver 406. The front end receiver 406 may filter, amplify, quadrature demodulate and quantize the signal. The digitized signal may be provided to a demodulator ("DEMOD") 408 where it may be despread with the short PNI and PNQ codes and decovered with the Walsh cover. The demodulated data may be provided to a decoder 410 that performs the inverse of the signal processing functions done at the base station 208, specifically the de-interleaving, decoding, and CRC check functions. Other signal processing configurations may be implemented at the subscriber station 400, and it is to be understood that the specific functions identified above are for illustrative purposes only. In general, processing in the subscriber station 400 may operate in conformance with the signal processing that occurs in the base station. In any event, after processing, the decoded data may then be provided to a data sink 414 at the subscriber station 400.

Prior to deposit in the data sink 414, the decoded data may be held in a de-jitter buffer 412. The de-jitter buffer 412 may apply a certain amount of delay to each data packet. Moreover, the de-jitter buffer may apply different amounts of delay to different data packets. Thus, when an increase in jitter is predicted, the de-jitter buffer may increase in size to add more delay time, and when a decrease in jitter is predicted, it may decrease in size to add less delay time. In order to do so, the de-jitter buffer may be configured to have an adaptable size.

The de-jitter buffer may adapt its size through a process referred to as "time-warping." Time warping is a process of compressing or expanding speech frames like the packets within the de-jitter buffer described herein. For example, when the de-jitter buffer begins to deplete, it may expand packets as they are retrieved from the de-jitter buffer by an application running on the subscriber station. When the de-jitter buffer becomes larger than the currently calculated de-jitter buffer size, it may compress packets as they are retrieved.

The compression and expansion of data packets may be likened to an increase and decrease in the rate at which packets are retrieved relevant to their arrival rate at the subscriber station. For example, if packets arrive and enter the de-jitter buffer once every 20 ms., but are retrieved only once every 40 ms., they are being expanded. This effectively increases the size of the de-jitter buffer, which is receiving twice as many packets as it is releasing. Similarly, if packets arrive and enter the de-jitter buffer once every 20 ms., but are retrieved every 10 ms, they are being compressed. This effectively decreases the size of the de-jitter buffer, which is receiving only half as many packets as it is releasing. The amount of expansion that may be applied to packets in the de-jitter buffer may be, for example, 50-75% (i.e. from 20 ms. to 30-35 ms.). The amount of compression that may be applied to packets in the de-jitter buffer may be, for example, 25% (i.e., from 20 ms. to 15 ms.). Although these compression rates may prevent significant degradation in voice quality, those skilled in the art will recognize that other rates may also be effectively used.

A processor 416, in communication with the de-jitter buffer, may calculate the amount of delay (i.e., the size of the de-jitter buffer) as a function of characteristics of the air link. These characteristics may be measured by the subscriber station 400 and used by the processor 416 to calculate appropriate de-jitter buffer sizes, as will now be described in further detail.

In wireless communication systems, certain measurable information may be highly correlated with packet jitter experienced at a subscriber station. For example, as described above, a significant contributor to variance in packet delivery delay is the air interface being used in the communications system. In particular, it is known that in 1×EV-DO systems, sector loading is correlated to end to end message delay and packet jitter. Sector loading may be estimated, for example, based upon the RA bit or the TCV bit. Signal quality is also correlated to packet jitter. For example, the average sector signal quality is correlated to end to end message delay, while the variance in sector signal quality is correlated to packet jitter. Additionally, handoffs between base stations are correlated to jitter. Based on these relationships, the de-jitter buffer 412 disclosed herein may adaptively provide enhanced performance. Adaptations in the de-jitter buffer size may occur, for example, at initialization, during steady state operation and during handoffs.

Sector loading, signal quality and signal quality variance may be used as inputs to the de-jitter buffer, in order to enhance operation at initialization. As explained above, de-jitter buffers are typically initialized with conservative values, to ensure that sufficient delay is added to arriving packets even before the exact degree of jitter is determined. In the illustrative de-jitter buffer 412 disclosed herein, information besides the packet arrival statistics contained in the packets may be used as an input to determine realistic values for initialization. For example, if sector loading is low, signal quality received at the subscriber station is high, and the variance of the signal quality is low, the subscriber station 400: may be considered stationary and/or in a good coverage area. Under such favorable conditions, the jitter may be estimated to be small, and the de-jitter buffer may be configured to have a small size. Sector loading may be determined by the RA bit or the TCV bit, as explained above. These bits may be received from a base station through the antenna 404 and interpreted by the processor 416. The processor 416 may then instruct the de-jitter buffer 412 to adapt accordingly. Thus, the illustrative de-jitter buffer need not be initialized with conservative and unnecessarily long delay values. In the case of VoIP, lower initial values for the de-jitter buffer translate into smaller delays at the beginning of a user's VoIP call and, accordingly, improved service for the user.

After initialization, such as during steady state operation, signal quality within a sector may be used to enhance de-jitter buffer operation. Changes in signal quality may be detected by a subscriber station even before those changes begin to affect packet arrival times. Thus, signal quality measurements may be made to detect changes, and those measurements may be used to adjust the de-jitter buffer size before the affected packets begin arriving.

To detect changes in signal quality, the sector signal quality may be measured over time. By keeping a running average, the average signal quality and signal quality variance over time may be calculated. Both positive and negative changes in the signal quality may thus be identified, and interpreted by the processor 416, which can in turn induce appropriate adaptation of the de-jitter buffer 412. For example, a sector signal quality change may indicate an impending change in packet delay, thus triggering the de-jitter buffer to adapt its size in preparation for the new delay time.

In one embodiment, a filter may be employed to track a running average of signal quality. Short term averages may be compared to detect changes in the sector signal quality. One example of a filter that may be used is a 64 slot filter having a 1.66 ms. slot length. This would result in short term averages of approximately 20 ms. It will be recognized by those skilled in the art that other filters may be used as well. By comparing consecutive values in the running average measurements, the subscriber station may detect changes in the sector signal quality. If the signal quality variance indicates a negative change, increased packet delay may be anticipated and the processor 416 may instruct de-jitter buffer 412 to increase its size in preparation for the delay. On the other hand, if change from low signal quality to high signal quality is detected, a decrease in packet delay may be expected and the de-jitter buffer 412 may reduce its size.

In addition to initialization and steady state operation, the de-jitter buffer disclosed herein may adapt in anticipation of handoff events. Preliminary information regarding planned or scheduled handoffs, which may be generated by the subscriber station 400, may be used to trigger the de-jitter buffer 412 to adapt prior to the actual handoff event. Handoffs may be the largest source of sudden and extreme packet jitter in 1×EV-DO systems and in other wireless systems. Handoff events are triggered by the subscriber station, and they are typically scheduled several ms before their execution. In 1×EV-DO, for example, a handoff may be scheduled more than 100 ms. before its execution. In the illustrative embodiment disclosed herein, the scheduling information may be provided to the de-jitter buffer 412, which can than be adapted in advance of the handoff.

The subscriber station 400 may include a sector selection algorithm that monitors the strength of pilot signals as the subscriber station 400 moves in relation to various base stations. When the pilot signal from a connected base station decreases sufficiently that a handoff to a new base station is required, the sector selection algorithm may generate a signal that is sent to the connected base station to inform it of the scheduled handoff. This signal may, in one embodiment, also be sent to the processor 416 or to the de-jitter buffer 412. The signal may trigger the de-jitter buffer 412 to increase its size in preparation for the impending handoff. Alternatively, the sector selection algorithm, which may be implemented by a processor such as the processor 416, may send a signal directly to the de-jitter buffer 412 at or around the same time that the signal is issued to the connected base station. This would allow the de-jitter buffer 412 even more time to adjust before the handoff event occurs. After the handoff is complete, the sector selection algorithm may issue a signal to the de-jitter buffer 412 that triggers it to resume normal operation.

Figure 5:
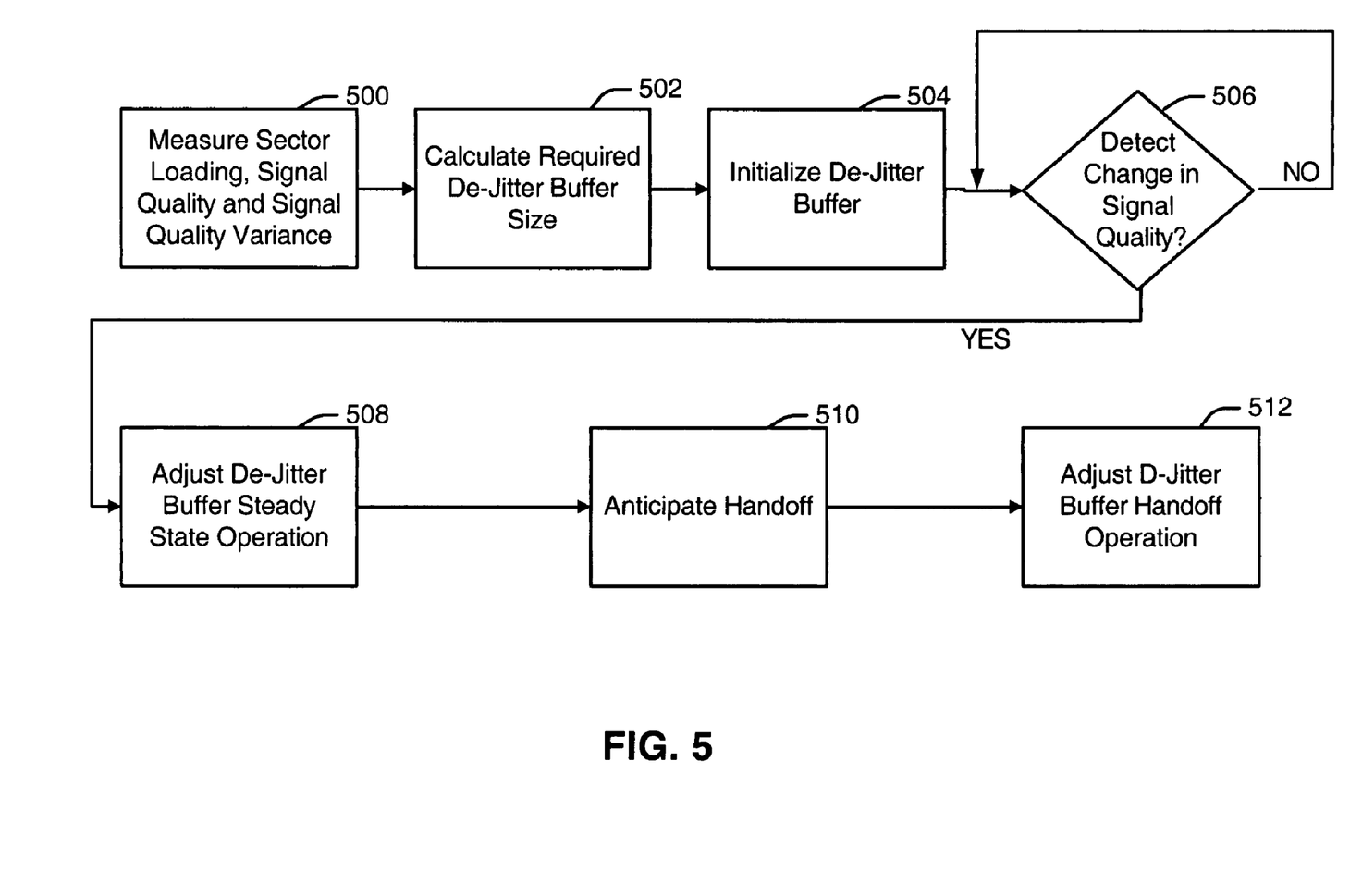
FIG. 5 is a flow chart illustrating the process of an illustrative de-jitter buffer.

FIG. 5 illustrates a method of adaptively adjusting a de-jitter buffer, such that its performance is enhanced in accordance with characteristics of the air interface being used. Any portion of the method illustrated in FIG. 5 may be used alone, or in combination with the other portions, to enhance operation of the de-jitter buffer. At block 500, sector loading, signal quality, or signal quality variance may be measured. Based on these measurements, or any combination of them, the approximate delay of packets arriving in the signal in that sector may be estimated. The appropriate de-jitter buffer size may be calculated accordingly, at block 502. For example, if the packet arrival delay is estimated to be small, the de-jitter buffer size may be small. On the other hand, if the packet arrival delay is estimated to be substantial, the de-jitter buffer size may need to be larger. At block 504, the de-jitter buffer is initialized in accordance with the packet delay that was estimated based on the various channel conditions.

After initialization, operation of the de-jitter buffer may be adapted in accordance with certain events that may occur during transmission of a message. For example, if the signal quality changes because sector loading increases or the subscriber station moves away from the base station, packet jitter may increase. The de-jitter buffer size may be adapted accordingly, before the increase occurs. At block 506, a change in signal quality may be detected. Then, at block 508, steady state operation of the de-jitter buffer may be adjusted by either increasing or decreasing the de-jitter buffer size in accordance with the signal quality change. For example, if the signal quality increased, the de-jitter buffer size may be decreased because less jitter may be anticipated. On the other hand, if the signal quality decreased, the de-jitter buffer size may be increased because an increase in jitter may be anticipated.

As explained above, another event that may trigger a change in packet delay variance is a handoff. At block 510, a handoff may be anticipated by a scheduling event. For example, the subscriber station may schedule a handoff, and may provide the scheduling information to the de-jitter buffer which would then anticipate the handoff. At block 512, the de-jitter buffer may be adjusted to accommodate the impending handoff. Specifically, the de-jitter buffer may increase in size to effectively handle the increased jitter that will be experienced when the handoff occurs. Adjustment of the de-jitter buffer at block 512 may also include reducing the de-jitter buffer size after a handoff, when lower jitter is again expected.

Of course, it is to be understood that after initialization, the adaptive procedures illustrated in FIG. 5 may be performed in any order and are not limited to the precise order depicted. For example, a handoff may occur before the signal condition changes. In that case, the de-jitter buffer size may be adapted to accommodate the handoff prior to adjusting the de-jitter buffer size in response to a change in signal quality.

Thus, a novel and improved method and apparatus for removing jitter from wireless communications. Those of skill in the art would understand that the data, instructions, commands, information, signals, bits, symbols, and chips that may be referenced throughout the above description are advantageously represented by voltages, currents, electromagnetic waves, magnetic fields or particles, optical fields or particles, or any combination thereof. Those of skill would further appreciate that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application. As examples, the various illustrative logical blocks, modules, circuits, and algorithm steps described in connection with the embodiments disclosed herein may be implemented or performed with a digital signal processor (DSP), an application specific integrated circuit (ASIC), a field programmable gate array (FPGA) or other programmable logic device, discrete gate or transistor logic, discrete hardware components such as, e.g., registers and FIFO, a processor executing a set of firmware instructions, any conventional programmable software module and a processor, or any combination thereof designed to perform the functions described herein. The processor may advantageously be a microprocessor, but in the alternative, the processor may be any conventional processor, controller, microcontroller, programmable logic device, array of logic elements, or state machine. The software module could reside in RAM memory, flash memory, ROM memory, EPROM memory, EEPROM memory, registers, hard disk, a removable disk, a CD-ROM, or any other form of storage medium known in the art. An exemplary processor is advantageously coupled to the storage medium so as to read information from, and write information to, the storage medium. In the alternative, the storage medium may be integral to the processor. The processor and the storage medium may reside in an ASIC. The ASIC may reside in a telephone or other user terminal. In the alternative, the processor and the storage medium may reside in a telephone or other user terminal. The processor may be implemented as a combination of a DSP and a microprocessor, or as two microprocessors in conjunction with a DSP core, etc.

Illustrative embodiments of the present invention have thus been shown and described. It would be apparent to one of ordinary skill in the art, however, that numerous alterations may be made to the embodiments herein disclosed without departing from the spirit or scope of the invention. Therefore, the present invention is not to be limited except in accordance with the following claims.

What is claimed is:

1. A method for adapting a de-jitter buffer for voice communications, the method comprising:
    detecting a change in a characteristic of an air link, wherein the change in the characteristic of the air link is based on at least one of signal-to-interference-and-noise ratio (SINR) and sector signal quality;
    predicting a future packet delay based on the change in the characteristic, wherein the predicted future packet delay is inversely proportional to the change in the characteristic of the air link; and
    adapting the de-jitter buffer based on the predicted future packet delay before the change in the characteristic of the air link affects packet arrival times, wherein the adapting comprises increasing or decreasing the de-jitter buffer size by an amount based on the predicted future packet delay.

2. The method of claim 1, wherein the change in the characteristic of the air link is based on the SINR.

3. The method of claim 1, wherein the change in the characteristic is based on the sector signal quality.

4. The method of claim 3, wherein the change in the characteristic is based on variance in the sector signal quality.

5. The method of claim 1, wherein the predicted future packet delay is an increase in packet delay, and wherein the de jitter buffer is adapted by increasing its size.

6. The method of claim 1, wherein the predicted future packet delay comprises a decrease in packet delay, and wherein the de-jitter buffer is adapted by decreasing its size.

7. A method as in claim 1, wherein adapting the de-jitter buffer further comprises:
- initializing the de-jitter buffer based on the predicted future packet delay.

8. The method of claim 7, wherein the de-jitter buffer is initialized to a size calculated as a function of the predicted future packet delay.

9. A non-transitory computer readable media embodying a program of instructions executable by a computer to perform a method of adapting a de-jitter buffer, the method comprising:
- detecting a change in a characteristic of an air link, wherein the change in the characteristic of the air link is based on at least one of signal-to-interference-and-noise ratio (SINR) and sector signal quality;
- predicting a future packet delay based on the change in the characteristic of the air link, wherein the predicted future packet delay is inversely proportional to the change in the characteristic of the air link; and
- adapting the de jitter buffer based on the predicted future packet delay before the change in the characteristic of the air link affects packet arrival times, wherein the adapting comprises increasing or decreasing the de-jitter buffer size by an amount based on the predicted future packet delay.

10. A method for adapting a de-jitter buffer for voice communications, the method comprising:
- detecting a change in a characteristic of an air link, wherein the change in the characteristic is based on at least one of packet error rate and sector loading;
- predicting a future packet delay based on the change in the characteristic, wherein the predicted future packet delay is proportional to the change in characteristic; and
- adapting the de-jitter buffer based on the predicted packet delay before the change in the characteristic affects packet arrival times, wherein the adapting comprises increasing or decreasing the de-jitter buffer size by an amount based on the predicted packet delay.

11. A subscriber station, comprising:
- a receiver configured to receive communications signals over a wireless air link;
- a processor configured to receive measurements of an air link characteristic, predict a future packet delay based on a change in the air link characteristic, and calculate and adapt a de-jitter buffer size based on the predicted future packet delay before the change in the air link characteristic affects packet arrival times, wherein the predicted future packet delay is inversely proportional to the change in the air link characteristic, wherein the adapting comprises increasing or decreasing the de-jitter buffer size by an amount based on the predicted future packet delay, and wherein the change in the air link characteristic is based on at least one of signal-to-interference-and-noise ratio (SINR) and sector signal quality; and
- a de-jitter buffer configured to have an adaptable size capable of conforming to the calculated de-jitter buffer size.

12. The subscriber station of claim 11, wherein the change in the air link characteristic is based on the SINR.

13. The subscriber station of claim 11, wherein the change in the air link characteristic is based on the sector signal quality.

14. The subscriber station of claim 13, wherein the change in the air link characteristic is based on variance in the sector signal quality.

15. A jitter compensation apparatus, comprising:
- means for detecting a change in a characteristic of an air link, wherein the change in the characteristic of the air link is based on at least one of signal-to-interference-and-noise ratio (SINR) and sector signal quality;
- means for predicting a future packet delay based on the change in the characteristic, wherein the predicted future packet delay is inversely proportional to the change in the characteristic of the air link;
- means for storing data packets;
- means for storing the predicted future packet delay corresponding to each data packet; and
- means for adjusting a size of the de-jitter buffer based on the predicted future packet delay before the change in the characteristic of the air link affects packet arrival times, wherein the adjusting comprises increasing or decreasing the de-jitter buffer size by an amount based on the predicted future packet delay.

16. The apparatus as in claim 15, wherein the apparatus is adapted to process Voice over Internet Protocol (VoIP) data.

17. The apparatus as in claim 15, wherein the sector signal quality is a function of sector loading in a wireless communication system.

18. The apparatus as in claim 17, wherein the sector signal quality is a function of a reverse activity bit.

19. The apparatus as in claim 17, wherein the sector signal quality is a function of a traffic channel valid bit.

20. The apparatus as in claim 15, wherein the apparatus is adapted to adjust the size of the de-jitter buffer to anticipate a handoff.

21. The apparatus as in claim 15, wherein the means for adjusting incorporates time-warping.

22. The apparatus as in claim 21, wherein time-warping is a function of a rate of data received.

* * * * *